United States Patent [19]

Feist et al.

[11] Patent Number: 4,490,919
[45] Date of Patent: Jan. 1, 1985

[54] LEVELING ARRANGEMENT FOR MEASURING TERRAIN POINTS

[76] Inventors: Wieland Feist, 3, Karl-Barthel-Str., 6902 JENA-Lobeda, District of Gera; Gerhard Hüther, 36, Eugen-Diederichs-Str., 69 JENA, District of Gera, both of German Democratic Rep.

[21] Appl. No.: 338,676

[22] Filed: Feb. 16, 1982

[30] Foreign Application Priority Data

Apr. 1, 1981 [DD] German Democratic Rep. ... 228811

[51] Int. Cl.³ .......................... G01C 5/00; G01C 5/02
[52] U.S. Cl. .......................... 33/290; 33/264;
33/293; 33/DIG. 21; 356/4
[58] Field of Search .................... 33/1 H, 125 A, 227, 33/264, 286, 290, 291, 293, DIG. 4, DIG. 21; 356/4, 4.5, 5

[56] References Cited

U.S. PATENT DOCUMENTS

| | | | |
|---|---|---|---|
| 3,736,058 | 5/1973 | Iadarola | 356/4 |
| 3,790,277 | 2/1974 | Hogan | 356/4 |
| 4,029,415 | 6/1977 | Johnson | 356/4 |
| 4,030,832 | 6/1977 | Rando et al. | 33/293 |
| 4,035,084 | 7/1977 | Ramsey | 33/291 |

FOREIGN PATENT DOCUMENTS

| | | | |
|---|---|---|---|
| 1923055 | 11/1970 | Fed. Rep. of Germany | 33/290 |
| 1366877 | 7/1964 | France | 33/290 |
| 714209 | 2/1980 | U.S.S.R. | 33/1 H |

Primary Examiner—Richard R. Stearns

[57] ABSTRACT

The invention relates to a leveling arrangement for measuring the elevations above terrain points, in which a horizontal measuring beam originating from a distance measuring device searches a first deviating means and, after detection, a second deviating means. Both deviating means are perpendicularly arranged above terrain points marked by a stage each, which, in turn are provided with reflectors. The latter reflect to themselves the measuring beam directed by said deviated means upon said reflectors. Thus the measurement of the altitude of the different terrain points is converted into a distance measurement. The deviating means are triple reflectors, detectors can additionally be provided at the deviating means for detecting the measuring beam. The distance measuring device can be swingingly suspended on a vehicle.

3 Claims, 4 Drawing Figures

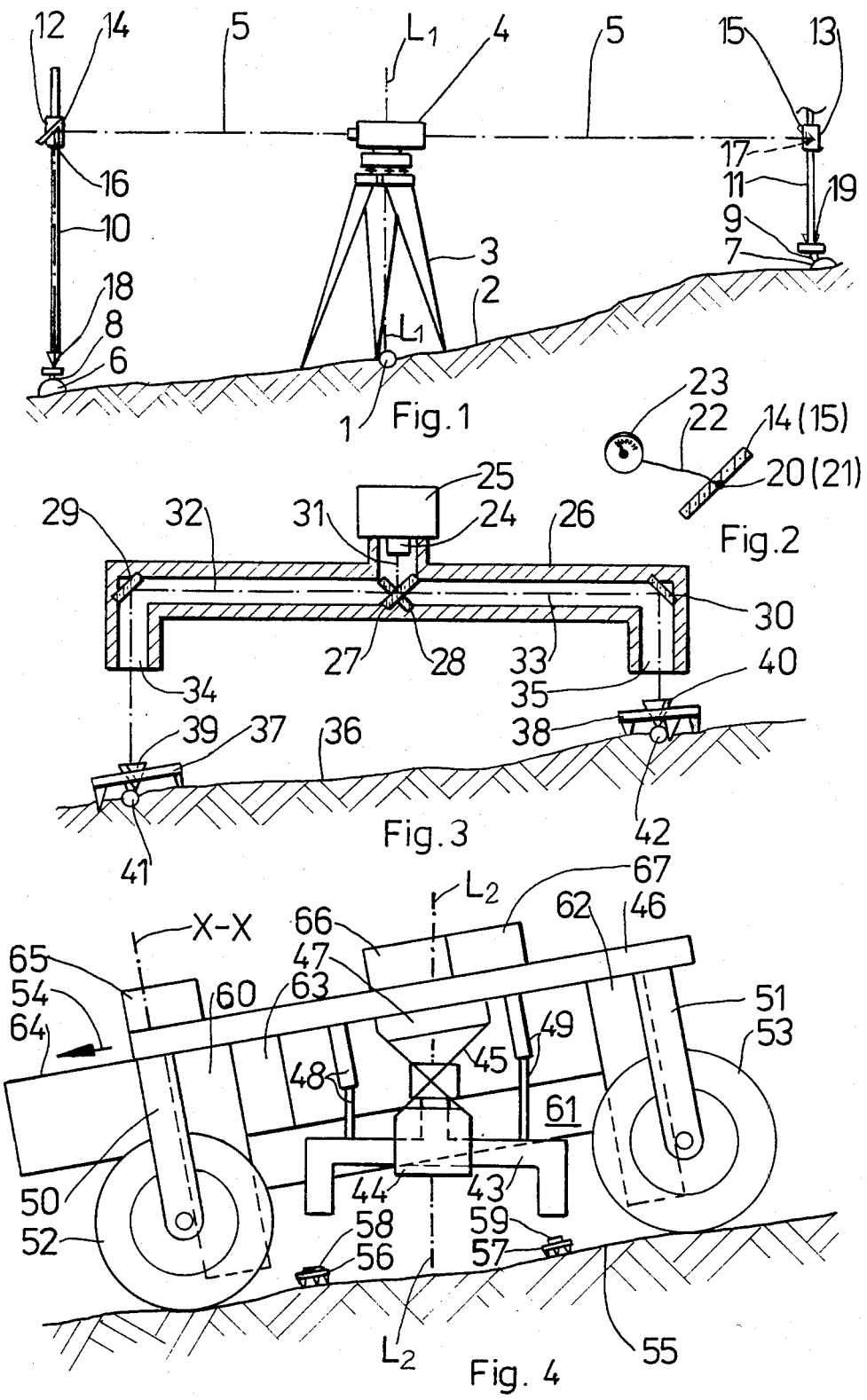

LEVELING ARRANGEMENT FOR MEASURING TERRAIN POINTS

The invention relates to an arrangement for measuring the elevations of terrain points particularly for use in surveying in which an electro-optical distance measuring device emits a measuring beam to a terrain point, thus establishing a horizontal sighting line to a respective sighting member set upon each terrain point to be measured. Measurements of terrain points and, in particular, of elevations are conventionally performed by geometric, trigonometric or barometric leveling.

The geometric leveling is generally accomplished by a level set upon a terrain point to be measured. The level emits a horizontal sighting line to a leveling rod held on a point to be measured, the elevation of said point is determined by the leveling instrument. It is also feasible to transfer the elevation from another point to the point to be measured.

This kind of leveling is time consuming and involves considerable expenditures for instrumentation and personnel depending on the degree of accuracy required.

The geometric leveling has been automated by mounting the instruments on vehicles, this requires considerable technical expenditures and very precise measuring devices at the points to be measured when high accuracy is a demand. Since the respective measuring devices, namely level and rod, are positioned remote from each other in the terrain the sighting line and the devices, respectively, are subject to a different atmospheric and stability conditions what involves a reduction of accuracy of measurement, so do the changing distances between the leveling rod and the level when moved in a terrain.

In the trigonometric leveling the height measurement is reduced to an angular measurement.

The measuring instruments employed are aranged at the place of the level, since, however, the measurements are mostly far-ranging the atmospheric influences falisfy the measuring results. Therefore, the trigonometric leveling is not used for precision measurements of elevations of terrain points.

Further methods for elevation measurements of terrain points are the barometric leveling based upon different atmospheric pressures at different heights, and the inertia navigation which exploits the gravity variations in the course of the measurements.

Both methods are still less accurate than the aforementioned. Finally, grade levelling in combination with vehicles is known which method automatically determines the distances from the rotations of the wheels of the vehicle and from the associated inclinations detected by an inclinometer. The latter kind of measurement is not very suitable for leveling purposes due to the very inaccurate electro-optical distance measurement involved.

It is an object of the present invention to obviate the above disadvantages.

It is a further object of the present invention to provide an automated leveling arrangement which operates according to an entirely new principle with respect to the previous local separation between the level and the leveling rod.

It is a further object of the present invention to provide an arrangement for leveling and elevation measurement in which an auxiliary member is employed instead of the leveling rod to substantially eliminate ambient interferences and measuring errors caused by the operator.

These and other objects are realised in a leveling arrangement for measuring the elevations of points in which the level is an electro-optical distance measuring device, and the auxiliary member is a deviating means for deviating a measuring beam and in which a reflector is provided at the place of a terrain point to be measured for back-reflecting the measuring beam in itself. Advantageously, a control means serves to render horizontal the measuring beam.

The leveling measurement is reduced to a distance measurement the direction of which is oriented relative to the vertical direction.

When the level is positioned between two elevation points to be measured then, in the event of a horizontally arranged distance measuring device and with a horizontal sighting line, the distance to the deviating means and to the reflector of the back-sight elevation point is measured and then the distance is measured to the deviating means and to the reflector of the fore-sighted elevation point. The distance to the backsight deviating means is deducted from the distance to the backsight reflector, and the distance to the foresight deviating means is deducted from the distance to the foresight reflector, and, thus, the respective altitude of the deviating means position is obtained via the reflector.

From a difference formation between the elevation in the backsight and that in the foresight the difference of heights between both points to be measured is obtained.

When, the distance between the distance measuring device and the backsight deviating means, on the one hand, and the foresight deviating means on the other hand are equal, then the difference of height between both elevation points to be measured is directly obtained from the difference between the distances of the electro-optical distance measuring device and the backsight reflector and the foresight reflector.

Advantageously, the distance measuring device operates with electro-magnetic or acoustic waves.

The distance measurement can be performed in different heights over the measuring points. To this end the deviating means is displaceably arranged in a vertical guide positioned upon the terrain point to be measured and connected to a second reflector which, in analogy to the first reflector reflects a portion of the measuring beam in itself back to the distance measuring device.

Thus, the distance measuring device delivers the horizontal distance to the measuring point.

Advantageously, the latter is provided with a detector for detecting a portion of said measuring beam automatically to adjust the deviating means via a control circuit and respective servo-means.

An automated operation of the measuring arrangement is obtained when providing two deviating means and respectively associated measuring point reflectors which are arranged in one plane with the distance measuring device.

The deviating means are equally spaced from the distance measuring device and are rididly connected to the latter. Advantageously, the deviating means are swingingly suspended on a vehicle in combination with the distance measuring device.

In order that the invention may be more readily understood reference is made to the accompanying drawings in which illustrate diagrammatically and by way of example three embodiments thereof and where FIG. 1 is a schematic view of a leveling arrangement for long range measuring of elevations of points in a terrain, FIG. 2 is a schematic view of a deviating means for the arrangement in combination with detecting means, FIG. 3 is a further embodiment of an arrangement for measuring elevations of points in a terrain in which the electro-optical distance measuring device and the deviating means are comprised in a common component, and FIG. 4 is a further embodiment of the arrangement mounted on a vehicle.

In FIG. 1 a distance measuring device 4 having a vertical axis of rotation $L_1$—$L_1$ is set up at a terrain point 1 of a terrain 2 on a tripod 3.

The distance measuring device 4 emits a measuring beam 5 defining a sighting line (5).

The spikes 8 and 9 mark two further measuring points (8, 9) connected to bases (stages) 6 and 7, respectively, upon which guides 10 and 11, respectively, are mounted for guiding members 12 and 13, respectively.

A deviating means 14 and a triple reflector 16 are rigidly connected to the member 12 and a deviating means 15, and a triple reflector 17 to the member 13.

Further triple reflectors 18 and 19, respectively, are attached to the bottom portion of the guides 10 and 11, respectively.

The deviating means 14, 15 are each provided with detectors 20 and 21, respectively (FIG. 2). The deviating means 14 and 15, respectively, direct respective portions of the measuring beam 5 emitted from the distance measuring device 4 to the triple reflectors 18 and 19, respectively, which back reflect the respective portions of the measuring beam 5 via the deviating means 14 and 15, respectively, to the distance measuring device 4. The triple reflectors 16 and 17, respectively, directly back reflect further portions of the measuring beam 5 to the distance measuring device 4. The detectors 20, 21 (FIG. 2) are provided with connection lines 22 and an indicating means 23 and serve to detect the horizontal sighting line 5 of the distance measuring device. This is achieved in displacing the members 12 and 13, respectively, vertically along the guides 10 and 11, respectively, until the beam 5 is captured by the detectors 20, 21, respectively.

In operation, the distance measuring device 4 emits a measuring beam 5 towards the guide 10.

The member 12 is displaced along the guide 10 until the measuring beam 5 impinges upon the detector 20 of the deviating means 14 which via the line 22 delivers a respective signal to the indicating means 23.

Thus the member 12 incorporating the deviating means 14 and the triple reflector 16 are aligned with respect to their height, which can be read from the indicating means 23.

In a next step a distance $l_1$ between the triple reflector 16 and the distance measuring device 4 and a distance $l_2$ between the triple reflector 18 via the deviating means 14 and the distance measuring device 4 are measured. The difference $l_2-l_1$ yields a height $h_1$ which is the space of the deviating means 14 from the triple reflector 18.

The value $h_1$ is automatically calculated by the distance measuring device 4 from the difference $l_2-l_1$.

The distance between the triple reflector 18 and a terrain point to be measured is always the same (in the drawing the terrain point is 6) the value of the latter distance is included in the calculation operation of the distance measuring device 4.

In a next step the distance measuring device 4 is rotated about the vertical axis $L_1$—$L_1$ until the measuring beam 5 impinges upon the guide 11.

The member 13 with the deviating means 15 and the triple reflector 17 is displaced along the guide 11 until the detectors 21 of the deviating means 15 detect the beam 5 which is again indicated by the indicating means 23.

A distance $l_3$ between the distance measuring device 4 and the triple reflector 17 and a distance $l_4$ between the distance measuring device 4 and the triple reflector 4 is measured by the distance measuring device 4 which calculates, in analogy to the height $h_1$, a height $h_2$ from the vertical axis $L_1$—$L_1$.

The distance measuring device 4 calculates the height $h_2$ from the distance $l_4-l_3$, involving the constant value of the distance between the triple prism 19 and the terrain point (7) and, computes the value $\Delta h = h_1-h_2$ which is the difference of height between the terrain points 6, 7. Thus the height measurement is reduced to a distance measurement, the different methods for the latter being described in more detail in F. Deumlich "Instrumentenkunde der Vermessungstechnik", Berlin 1972, pages 265 to 296.

This kind of distance measurement satisfies high precision requirements.

In FIG. 3 a distance measuring device 25 is rigidly connected to a U-shape tubular arm 26 into which two deviating means 29, 30 are inserted in opposite portions of said arm 26.

In a central portion of said arm 26 two crossing reflectors 27, 28 are arranged adjacent an opening 24' in which an objective 24 of the distance measuring device 25 is located.

One half of the objective 24 is in optical alignment with the reflector 27 and the subsequent deviating means 29, the other half of the objective 24 is in optical alignment with the reflector 28 and the subsequent deviating mans 30.

The distance measuring device 25 emits a vertical measuring beam 31 which via the objective 24 impinges upon the crossing reflectors 27, 28 where the beam 31 is split into a first beam portion 32 and into a second beam portion 33, both beam portions 32, 33 are substantially horizontal and at right angles to the measuring beam 31.

The first beam portion 32 is folded by the deviating means 29 and leaves the U-shape arm by an opening 34 in parallel to the measuring beam 31 to impinge upon a triple reflector 39 mounted on a ground mark 37 which marks a terrain point 41 of a terrain 36.

The second beam portion 33 is folded by the deviating means 30 to be in parallel to the measuring beam 31 and impinges, after leaving the U-shape arm 26 by an opening 35, on a triple reflector 40 mounted on a ground mark 38 which marks a terrain point 42.

The deviating means 29, 30 render the first and second beam portion 32, 33 in parallel to one another and to the measuring beam 31, and direct said beam portions to the reflectors 39 and 40, respectively.

The beam portions 32 and 33 are reflected there back to themselves to the distance measuring device 25 via the deviating means 29 and 30, respectively, and via the crossing reflectors 27, 28.

The distance measuring device 25, in analogy to the distance measuring device 4 of FIG. 1 determines the difference of altitude between the two terrain points 41 and 42 of the terrain 36.

A particular feature is, that the distance between the reflector 27 and the deviating means 29 and the distance between the reflector 28 and the deviating means 30 are equal. The distances which are different are those between the deviating means 29 and the triple reflector 39 and between the deviating means 30 and the triple reflector 40, the difference between the respective distances make up the difference in height between the two terrain points 41 and 42 to be measured.

FIG. 4 shows the arrangement of FIG. 3 in combination with a schematic vehicle.

A distance measuring device 43 is mounted on a carrier 44 which, in turn, is hinged to a base 47 of a vehicle 46 via a cross-spring suspension 45.

By virtue of the latter the distance measuring device 43 is maintained in the perpendicular $L_2-L_2$. Damping means 48, 49 are provided at the distance measuring device 43, at the one hand, and at the base 46, on the other hand, which ensure a quick return to the rest position in the event of oscillation.

The vehicle 46 is provided with four equal seatings 50, 51 (only two visible in the drawing) which ensure a safe cross-country mobility and bearing for the four wheels 52, 53 (only two visible).

The bearings 50 with the wheels 52 are rotatably about an X—X of the vehicle 42 so that the wheels 53 accurately follow the front wheels 52.

In FIG. 4 the vehicle 46 moves in direction of an arrow 54.

A terrain 55 is marked by a stage 56 with a triple prism 58 and a stage 57 with a triple prism 59 which are both perpendicularly located under the distance measuring device 43.

A supply container 60 is secured to the vehile 46 in connection with a receiver 62 via an endless belt 61. The supply container 60 pays out triple prism stages 56 at certain distances which are picked-up by the receiver 62 and transported via the endless belt 61 to the supply container 60.

The pay-out/pick-up frequency is controlled by a unit 63 and is adjustable in dependence on the rotations of the wheel 52. The vehicle 46 is provided with a drive system 64 producing a controlled speed.

A maneuver unit 65 serves to handle the vehicle in a terrain. Furthermore, a power supply 66 and a measuring value evaluation unit 67 are provided.

The pay-out/measuring/pick-up operation takes place while the vehicle moves at a moderate speed.

The measuring operation proper is performed in analogy to that described in connection with FIG. 3.

The invention is not restricted to the above embodiments. Thus, the triple reflectors 39, 38 and 58, 59 can be triple prisms. Furthermore, instead of the stages 56, 57 in combination with the triple reflectors 58, 59 an endless reflecting belt can be employed.

We claim:

1. A leveling arrangement for measuring the elevation of terrain points, comprising in a terrain:
    an electro-optical distance measuring device emitting a measuring beam and having a vertical axis L—L,
    a first deviating means and a second deviating means,
    elongated mounting means for rigidly connecting said first and said second deviating means in opposition to one another and in spaced symmetry to said vertical axis L—L at least adjacent to said distance measuring device,
    said mounting means being a portion of said distance measuring device extending horizontally from both sides of said distance measuring device,
    said first and said second deviating means being mounted at the respective end portions of said elongated mounting means,
    a first ground mark for marking a first terrain point to be measured,
    a second ground mark for marking a second terrain point to be measured,
    a first reflecting means,
    a second reflecting means,
    a third reflecting means,
    a fourth reflecting means,
    said third and fourth reflecting means being associated to said first and second deviating means in optical alignment to said first and second deviating means, respectively, and to said electro-optical distance measuring device,
    said third reflecting means being for directing a portion of said measuring beam in said first deviating means,
    said fourth reflecting means being for directing another portion of said measuring beam to said second deviating means,
    said portion and said other portion of said measuring beam being at right angles (horizontal) to said vertical axis,
    said first reflecting means being mounted on said first ground mark,
    said second reflecting means being mounted on said second ground mark,
    said first deviating means being arranged perpendicularly above said first reflecting means,
    said second deviating means being arranged perpendicularly above said second reflecting means,
    said first deviating means and said second deviating means, respectively, being for deviating the horizontal portions of said measuring beam to said first and said second reflecting means, in parallel to said vertical axis L—L,
    said first and said second reflecting means being for back reflecting said measuring beam in parallel to said axis L—L to said first and said second deviating means and in parallel to said portion and to said other portion to said third and said fourth reflector, and in parallel to said measuring beam to said electro-optical distance measuring device.

2. An arrangement as claimed in claim 1, wherein said electro-optical distance measuring device and said first and said second deviating means are suspended by suspension means on a vehicle.

3. An arrangement as claimed in claim 1, wherein leveling means are provided for horizontally positioning said portion and said other portion of said measuring beam.

* * * * *